United States Patent
Struik

(10) Patent No.: US 8,862,866 B2
(45) Date of Patent: Oct. 14, 2014

(54) METHOD AND APPARATUS FOR PROVIDING AN ADAPTABLE SECURITY LEVEL IN AN ELECTRONIC COMMUNICATION

(75) Inventor: Marinus Struik, Toronto (CA)

(73) Assignee: Certicom Corp., Mississauga, Ontario (CA)

(*) Notice: Subject to any disclaimer, the term of this patent is extended or adjusted under 35 U.S.C. 154(b) by 735 days.

(21) Appl. No.: 10/885,115

(22) Filed: Jul. 7, 2004

(65) Prior Publication Data
US 2005/0076197 A1 Apr. 7, 2005

Related U.S. Application Data

(60) Provisional application No. 60/484,656, filed on Jul. 7, 2003.

(51) Int. Cl.
*H04L 29/06* (2006.01)
*H04L 9/08* (2006.01)

(52) U.S. Cl.
CPC ............... *H04L 63/105* (2013.01); *H04L 9/088* (2013.01)
USPC ........... 713/151; 713/150; 713/153; 713/155; 713/160; 713/193

(58) Field of Classification Search
USPC ................. 713/160, 153, 193, 150, 155, 151
See application file for complete search history.

(56) References Cited

U.S. PATENT DOCUMENTS

| | | | |
|---|---|---|---|
| 5,099,517 A | 3/1992 | Gupta et al. | |
| 5,301,287 A * | 4/1994 | Herrell et al. | 711/202 |
| 5,450,493 A * | 9/1995 | Maher | 380/30 |
| 5,638,448 A * | 6/1997 | Nguyen | 380/29 |
| 5,689,566 A * | 11/1997 | Nguyen | 713/155 |
| 5,832,228 A * | 11/1998 | Holden et al. | 709/225 |
| 6,101,543 A | 8/2000 | Alden et al. | |
| 6,108,583 A | 8/2000 | Schneck et al. | |
| 6,118,775 A * | 9/2000 | Kari et al. | 370/349 |
| 6,272,632 B1 | 8/2001 | Carman et al. | |
| 6,510,349 B1 * | 1/2003 | Schneck et al. | 700/9 |
| 6,760,768 B2 | 7/2004 | Holden et al. | |
| 6,782,473 B1 * | 8/2004 | Park | 713/160 |
| 6,865,426 B1 * | 3/2005 | Schneck et al. | 700/9 |

(Continued)

FOREIGN PATENT DOCUMENTS

| | | |
|---|---|---|
| EP | 1320010 A3 | 6/2003 |
| EP | 1326157 A2 | 7/2003 |

(Continued)

OTHER PUBLICATIONS

Cam-Winget, Nancy, et al. "Security flaws in 802.11 data link protocols." Communications of the ACM 46.5 (May 2003): pp. 35-39.*

(Continued)

*Primary Examiner* — Luu Pham
*Assistant Examiner* — Kari Schmidt
(74) *Attorney, Agent, or Firm* — Fish & Richardson P.C.

(57) ABSTRACT

A method of communicating in a secure communication system, comprises the steps of assembling a message at a sender, then determining a security level, and including an indication of the security level in a header of the message. The message is then sent to a recipient.

44 Claims, 3 Drawing Sheets

(56) References Cited

U.S. PATENT DOCUMENTS

| | | | |
|---|---|---|---|
| 6,918,034 B1* | 7/2005 | Sengodan et al. | 713/160 |
| 6,928,544 B2* | 8/2005 | Chu | 713/153 |
| 7,023,863 B1 | 4/2006 | Naudus et al. | |
| 7,024,609 B2* | 4/2006 | Wolfgang et al. | 714/748 |
| 7,036,015 B2 | 4/2006 | Vanstone et al. | |
| 7,107,335 B1 | 9/2006 | Arcieri et al. | |
| 7,143,137 B2* | 11/2006 | Maufer et al. | 709/205 |
| 7,233,948 B1* | 6/2007 | Shamoon et al. | 707/9 |
| 7,302,564 B2 | 11/2007 | Berlin | |
| 7,412,726 B1 | 8/2008 | Viswanath | |
| 7,437,548 B1 | 10/2008 | Alfieri | |
| 7,447,313 B2 | 11/2008 | Van Rijnsoever | |
| 7,467,406 B2 | 12/2008 | Cox et al. | |
| 7,526,807 B2 | 4/2009 | Chao et al. | |
| 7,600,038 B2 | 10/2009 | Struik | |
| 7,657,531 B2 | 2/2010 | Bisbee et al. | |
| 7,660,986 B1 | 2/2010 | Qiu et al. | |
| 7,965,843 B1 | 6/2011 | Maino et al. | |
| 8,069,483 B1 | 11/2011 | Matlock | |
| 2002/0035635 A1 | 3/2002 | Holden et al. | |
| 2002/0090086 A1 | 7/2002 | Van Rijnsoever | |
| 2002/0174352 A1* | 11/2002 | Dahl | 713/193 |
| 2003/0026255 A1 | 2/2003 | Poeluev et al. | |
| 2003/0035542 A1* | 2/2003 | Kim | 380/270 |
| 2003/0119484 A1* | 6/2003 | Adachi et al. | 455/411 |
| 2003/0159036 A1* | 8/2003 | Walmsley et al. | 713/168 |
| 2003/0226011 A1 | 12/2003 | Kuwano et al. | |
| 2004/0010691 A1* | 1/2004 | Nelson | 713/176 |
| 2004/0028409 A1* | 2/2004 | Kim et al. | 398/71 |
| 2004/0136527 A1 | 7/2004 | Struik | |
| 2004/0139312 A1* | 7/2004 | Medvinsky | 713/150 |
| 2004/0255001 A1* | 12/2004 | Oh et al. | 709/209 |
| 2005/0015583 A1* | 1/2005 | Sarkkinen et al. | 713/150 |
| 2005/0076197 A1 | 4/2005 | Struik | |
| 2005/0081032 A1 | 4/2005 | Struik | |
| 2005/0086501 A1 | 4/2005 | Woo et al. | |
| 2005/0108746 A1 | 5/2005 | Futagami et al. | |
| 2006/0064736 A1 | 3/2006 | Ahuja et al. | |
| 2006/0112431 A1 | 5/2006 | Finn et al. | |
| 2006/0140400 A1 | 6/2006 | Brown et al. | |
| 2006/0210071 A1 | 9/2006 | Chandran et al. | |
| 2007/0058633 A1 | 3/2007 | Chen et al. | |
| 2007/0160059 A1 | 7/2007 | Poeluev et al. | |
| 2007/0195788 A1 | 8/2007 | Vasamsetti et al. | |
| 2007/0255954 A1 | 11/2007 | Struik | |
| 2008/0177997 A1 | 7/2008 | Morais et al. | |
| 2008/0307524 A1 | 12/2008 | Singh et al. | |
| 2009/0319775 A1 | 12/2009 | Buer et al. | |
| 2011/0264915 A1 | 10/2011 | Cam-Winget et al. | |

FOREIGN PATENT DOCUMENTS

| | | |
|---|---|---|
| EP | 1324541 A3 | 7/2004 |
| WO | 00/10304 | 2/2000 |
| WO | 03/036857 | 5/2003 |
| WO | 2005/081032 | 4/2004 |
| WO | WO2005083970 A1 | 9/2005 |

OTHER PUBLICATIONS

Oppliger, Rolf. "Security at the Internet layer." Computer 31.9 (1998): pp. 43-47.*
Kent, S. & Atkinson, R., "Security Architecture for the Internet Protocol", RFC 2401, Nov. 1998, IETF.
Kent, S. & Atkinson, R., "IP Authentication Header", RFC 2402, Nov. 1998, IETF.
Dierks, T. & Allen, C., "The TLS Protocol", RFC 2246, Jan. 1999, pp. 23,28 to 30, IETF.
IEEE Standard 802.11, Standard for Telecommunications and Information Exchange between Systems—Local and metropolitan networks—Specific requirements—Part 11: Wireless LAN Medium Access Control (MAC) and Physical Layer (PHY) Specifications, 1999, pp. 34 to 41, 50 to 58, IEEE Press.
Specification of the Bluetooth System, Specification vol. 1—Core, Version 1.0B, Dec. 1, 1999, p. 160.
Hura et al.; "Data and Computer Communications: Networking and Internetworking"; CRC Press, 2001; pp. 337, 450, 453, 467, 471, 483, 484, 485, 489, 491, 526, 599, 609, 617, 618, 621, 937, 1086, 1117, 1118, 1132.
Sung et al.; "Design and Evaluation of Adaptive Secure Protocol for E-Commerce"; Proceedings of the 10th International Conference on Computer Communications and Networks; Oct. 15-17, 2001; pp. 32-39.
"Transmission Control Protocol"; RFC 0793; Darpa Internet Program; Information Sciences Institute; University of Southern California; Sep. 1981.
Search Report issued in U.K. Application No. 0418565.8 on Jan. 25, 2005; 4 pages.
Examination Report issued in U.K. Application No. 0418565.8 on Oct. 31, 2005; 7 pages.
Examination Report issued in U.K. Application No. 0418565.8 on Feb. 15, 2006; 2 pages.
Examination Report issued in U.K. Application No. 0418565.8 on Aug. 23, 2006; 3 pages.
Combined Search and Examination Report issued in U.K. Application No. 0623685.5 on Mar. 16, 2007; 5 pages.
Combined Search and Examination Report issued in U.K. Application No. 0721922.3 on Dec. 18, 2007; 5 pages.
Office Action issued in U.S. Appl. No. 10/921,161 on Mar. 25, 2008; 24 pages.
Office Action issued in U.S. Appl. No. 10/921,161 on Nov. 25, 2008; 30 pages.
Office Action issued in U.S. Appl. No. 10/921,161 on Dec. 9, 2009; 25 pages.
Office Action issued in U.S. Appl. No. 10/921,161 on Aug. 18, 2010; 27 pages.
Office Action issued in U.S. Appl. No. 10/921,161 on Jan. 27, 2011; 30 pages.
Office Action issued in U.S. Appl. No. 11/735,055 on Jul. 13, 2010; 21 pages.
Office Action issued in U.S. Appl. No. 11/735,055 on Dec. 22, 2010; 14 pages.
Office Action issued in Chinese Application No. 200780020042.X on Jan. 14, 2004; 10 pages.
Extended European Search Report issued in European Patent Application No. 07719535.2 on May 13, 2011; 6 pages.
Official Action issued in Japanese Application No. 2009-504535 on Aug. 17, 2011; 9 pages.
International Search Report and Written Opinion of the International Searching Authority issued in International Application No. PCT/CA2007/000608 on Aug. 28, 2007; 4 pages.
Office Action issued in U.S. Appl. No. 13/551,869 on Apr. 2, 2013; 11 pages.
Communication Pursuant to Article 94(4) EPC issued in European Application No. 07719535.2 on Mar. 8, 2013; 5 pages.
Office Action issued in Canadian Application No. 2,434,992 on Sep. 14, 2011; 3 pages.
Office Action issued in Canadian Application No. 2,478,274 on Mar. 14, 2013; 23 pages.
Examiner's Answer to Appeal Brief issued in U.S. Appl. No. 10/921,161 on Feb. 21, 2012; 30 pages.
Notice of Allowance issued in U.S. Appl. No. 10/921,161 on Apr. 12, 2012; 9 pages.
Office Action issued in U.S. Appl. No. 11/735,055 on Feb. 17, 2012; 14 pages.
Office Action issued in Canadian Application No. 2,478,274 on Feb. 3, 2012; 2 pages.
Office Action issued in Canadian Application No. 2,644,015 on May 23, 2012; 3 pages.
Office Action issued in Chinese Application No. 200780020042.X on Mar. 21, 2012; 10 pages.
Office Action issued in Chinese Application No. 200780020042.X on Aug. 13, 2012; 9 pages.
Communication Purusant to Article 94(4) EPC issued in European Application No. 07719535.2 on Feb. 17, 2012; 5 pages.

(56) References Cited

OTHER PUBLICATIONS

Office Action issued in U.S. Appl. No. 11/735,055 on Dec. 11, 2012; 15 pages.
Office Action issued in Canadian Application No. 2,434,992 on Dec. 5, 2012; 2 pages.
Examination Report issued in German Application No. 102004040312.0 on Oct. 24, 2012; 15 pages.
Office Action issued in Chinese Application No. 200780020042.X on Dec. 17, 2012; 7 pages.
Notice of Allowance issued in U.S. Appl. No. 13/551,869 on Sep. 27, 2013; 9 pages.
Office Action issued in U.S. Appl. No. 11/735,055 on May 24, 2013; 16 pages.
Notice of Allowance issued in Chinese Application No. 200780020042.X on May 6, 2013; 4 pages.
Notice of Allowance issued in Japanese Application No. 2011-251567 on Apr. 23, 2013; 3 pages.
Office Action issued in Korean Application No. 10-2008-7027745 on Jun. 28, 2013; 6 pages.
Office Action issued in Canadian Application No. 2,644,015 on Nov. 4, 2013; 4 pages.
Office Action issued in Canadian Application No. 2,478,274 on Jan. 7, 2014; 2 pages.
Communication Pursuant to Article 94(4) EPC issued in European Application No. 07719535.2 on Feb. 7, 2014; 7 pages.

* cited by examiner

METHOD AND APPARATUS FOR PROVIDING AN ADAPTABLE SECURITY LEVEL IN AN ELECTRONIC COMMUNICATION

This application claims priority from U.S. Provisional Patent Application No. 60/484,656 filed on Jul. 7, 2003

BACKGROUND OF THE INVENTION

1. Field of the Invention

The present invention relates to a method and apparatus for providing an adaptable security level in an electronic communication.

2. Description of the Prior Art

In electronic communications, it is often necessary to prevent an eavesdropper from intercepting message. It is also desirable to have an indication of the authenticity of a message, that is a verifiable identification of the sender. These goals are usually achieved through the use of cryptography. Private key cryptography requires sharing a secret key prior to initiating communications. Public key cryptography is generally preferred as it does not require such a shared secret key. Instead, each correspondent has a key pair including a private key and a public key. The public key may be provided by any convenient means, and does not need to be kept secret.

There are many variations in cryptographic algorithms, and various parameters that determine the precise implementation. In standards for wireless communications it has been customary to set these parameters in advance for each frame type. However, this approach limits the flexibility of the parameters.

When one device is communicating with several other devices, it will often need to establish separate parameters for each communication.

It is an object of the present invention to obviate or mitigate the above disadvantages.

SUMMARY OF THE INVENTION

In accordance with one aspect, there is provided a method and cryptographic unit for communicating between a sender and at least one recipient in a data communication system comprising the sender assembling a packet stream comprising a plurality of frames, each frame having a header and data; determining individually for each of the frames, a security level based on known security requirements, thereby allowing different frames to have different security to adapt to the nature of respective frames; including a corresponding indication of the security level in respective ones of the frames; and providing the frames for cryptographically processing each frame according to the corresponding indication of the security level.

In accordance with another aspect, there is provided a method and cryptographic unit for a recipient processing communications received from a sender in a data communication system comprising the steps of: receiving from the sender, a packet comprising a plurality of frames, each frame having a header and data, wherein respective ones of the frames includes a corresponding indication of a security level determined individually by the sender for each of the frames based on known security requirements, such that different frames are capable of having different security to adapt to each of the frames; and for each frame received, examining the indication of security level and rejecting the frame if it does not attain a minimum level.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
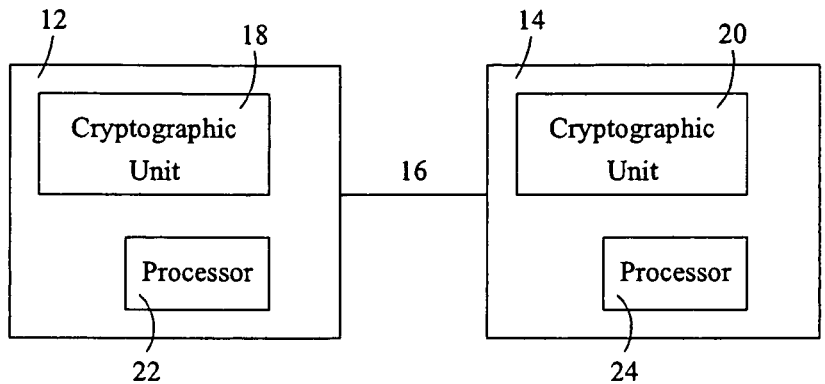
FIG. 1 is a schematic representation of a communication system.

Referring to FIG. 1, a communication system 10 includes a pair of correspondents 12, 14 connected by a communication link 16. Each correspondent 12, 14 includes a respective cryptographic unit 18, 20.

Each correspondent 12, 14 can include a processor 22, 24. Each processor may be coupled to a display and to user input devices, such as a keyboard, mouse, or other suitable devices. If the display is touch sensitive, then the display itself can be employed as the user input device. A computer readable storage medium is coupled to each processor 22, 24 for providing instructions to the processor 22, 24 to instruct and/or configure processor 22, 24 to perform steps or algorithms related to the operation of each correspondent 12, 14, as further explained below. The computer readable medium can include hardware and/or software such as, by way of example only, magnetic disks, magnetic tape, optically readable medium such as CD ROM's, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM provided in a support system. It should be noted that the above listed example mediums can be used either alone or in combination.

Figure 2:
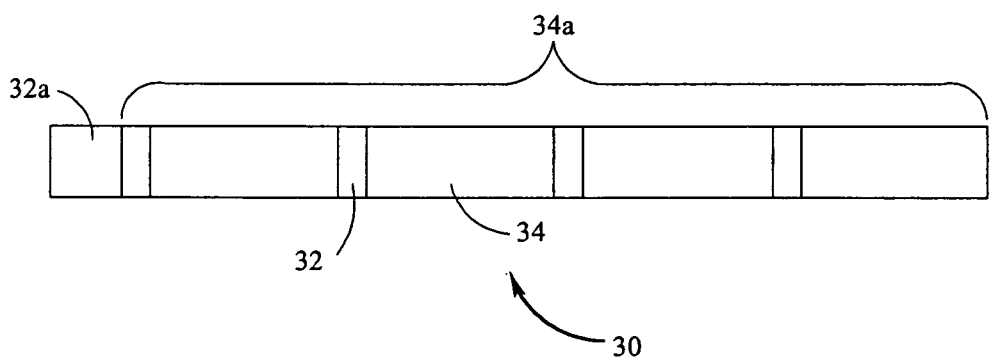
FIG. 2 is a schematic representation of an information frame exchanged in the communication system of FIG. 1.
Figure 3:
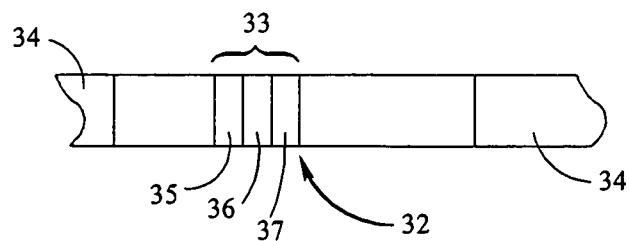
FIG. 3 is a schematic representation of a frame control portion of the frame of FIG. 2.

In order to transfer data between the correspondents 12, 14, a packet stream 30 is assembled at one of the correspondents in accordance with a defined protocol. The packet stream 30 is shown schematically in FIG. 2 and is composed of one or more frames 31, each of which has a header 32 and data 34. In some protocols, the packet may itself be organised as a frame with a header 32a and the data 34a consisting of a collection of individual frames. The header 32 is made up of a string of bits and contains control information at specified locations within the bit stream.

Included in each of the headers 34 are security control bits 33, that includes a security mode bit 35 and integrity level bits 36, 37.

In this embodiment, security mode bit 35 is used to indicate whether encryption is on or off. Security bits 36 and 37 together are used to indicate which of four integrity levels, such as 0, 32, 64, or 128 bit key size is utilised. The security mode bit may be used to indicate alternative modes of operation such as authentication, and the number of bits may be increased to accommodate different combinations. It will be recognized that providing security bits in each frame 31 of the stream 30 allows the security level to be on a frame-by-frame basis rather than on the basis of a pair of correspondents, therefore providing greater flexibility in organizing communications.

In order to provide security, certain minimum security levels may be used. These levels should be decided upon among all of the correspondents through an agreed-upon rule. This rule may be either static or dynamic.

Figure 4:
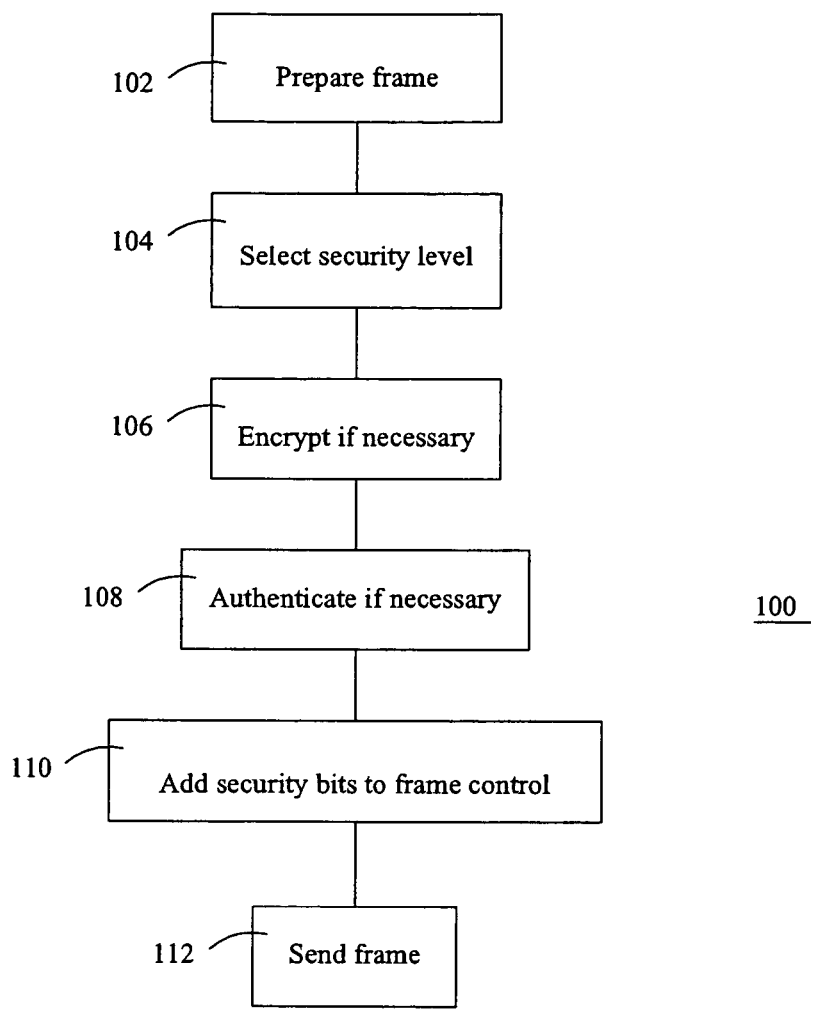
FIG. 4 is a schematic representation of a method performed by a sender in FIG. 1.

In operation, the correspondent 12 performs the steps shown in FIG. 4 by the numeral 100. To send information to the correspondent 14. First, the correspondent 12 prepares data and a header at step 102. Then it selects the security level at step 104. The security level is determined by considering the minimum security level required by the recipient, the nature of the recipient, and the kind of data being transmitted. If the security level includes encryption, then the correspondent 12 encrypts the data at step 106. If the security level includes authentication, then the correspondent 12 signs the data at step 108. Then the correspondent 12 includes bits indicating the security mode and security level in the frame control at step 110. The correspondent 12 then sends the frame to the correspondent 14.

Figure 5:
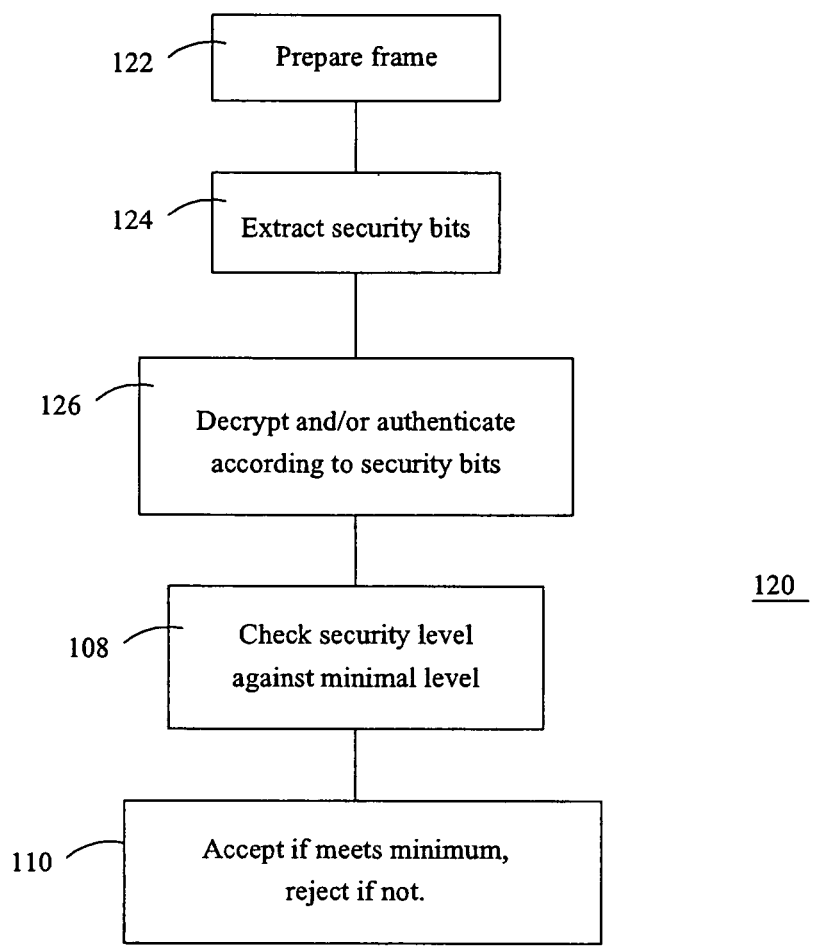
FIG. 5 is a schematic representation of a method performed by a recipient in FIG. 1.

Upon receiving the frame, the correspondent 14 performs the steps shown in FIG. 5 by the numeral 120. The correspondent 14 first receives the frame at step 122. It then extracts the security bits at step 124. If the security mode bits 35 indicate encryption, then the correspondent 14 decrypts the data at step 126. If the security bits indicate authentication, then the correspondent 14 verifies the signature at step 126. Finally, the correspondent 14 checks the security level to ensure it meets predetermined minimum requirements. If either the encryption or authentication fails, or if the security level does not meet the minimum requirements, then the correspondent 14 rejects the message.

It will be recognized that providing security bits and an adjustable security level provides flexibility in protecting each frame of the communication. It is therefore possible for the sender to decide which frames should be encrypted but not authenticated. Since authentication typically increases the length of a message, this provides a savings in constrained environments when bandwidth is at a premium.

In a further embodiment, the correspondent 12 wishes to send the same message to multiple recipients 14 with varying minimum security requirements. In this case, the correspondent 12 chooses a security level high enough to meet all of the requirements. The correspondent 12 then proceeds as in FIG. 4 to assemble and send a message with the security level. The message will be accepted by each recipient since it meets each of their minimum requirements. It will be recognized that this embodiment provides greater efficiency than separately dealing with each recipient's requirements.

In another embodiment, a different number of security bits are used. The actual number of bits is not limited to any one value, but rather may be predetermined for any given application. The security bits should indicate the algorithm parameters. They may be used to determine the length of a key as 40 bits or 128 bits, the version of a key to be used, or any other parameters of the encryption system.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method performed by a communication device, said method comprising:

receiving a frame, wherein the frame indicates a version of a key to be used in an encryption system;

said communication device preparing a plurality of frames, each frame having a header and data; and on a frame-by-frame basis, said communication device processing each individual frame by:

determining a security level for that individual frame, the security level indicating whether to provide encryption for the individual frame and whether to provide integrity for the individual frame; and based on said security level, including security control bits in the header of that individual frame, said communication device communicating the plurality of frames to a recipient device, wherein the security control bits include one or more security mode bits and integrity level bits, wherein the one or more security mode bits are used to indicate whether encryption is on or off, wherein the integrity level bits indicate which of at least four integrity levels is utilized, the integrity levels corresponding to signing operations of a sender of increasing strength, and wherein said security control bits allow the recipient device to identify said security level for each individual frame and to reject an individual frame if said security level does not comply with a minimum security level required by the recipient device.

2. The method according to claim 1, wherein said communication device provides the plurality of frames for transmission to multiple recipients, and determining said security level includes determining a minimum security level to satisfy all of the recipients, wherein said security control bits are based on said minimum security level.

3. The method according to claim 1, wherein said security level is determined based on predetermined minimum requirements.

4. The method according to claim 3, wherein said predetermined minimum requirements are determined among said communication device and at least one recipient device based on an agreed-upon rule.

5. The method according to claim 1, wherein said security level is determined based upon content of that individual frame.

6. The method according to claim 1, further comprising said communication device encrypting the data for each individual frame according to said security level for the frame.

7. The method according to claim 1, wherein said security control bits include an indication of a cryptographic algorithm parameter.

8. The method according to claim 1, further comprising the communication device signing the header and data for each individual frame according to said security level for the frame.

9. The method of claim 1, wherein the number of integrity levels is four, and the four integrity levels correspond to key lengths of 0, 32, 64, and 128 bits.

10. The method of claim 1, wherein one of the integrity levels uses a key length of 128 bits.

11. The method of claim 1, wherein one of the integrity levels indicates no integrity security.

12. The method of claim 1, wherein the number of integrity levels is at least four, and the at least four levels include four levels corresponding to key lengths of 0, 32, 64, and 128 bits.

13. A non-transitory computer-readable storage medium comprising computer-executable instructions that are operable when executed by data processing apparatus to perform operations comprising:

receiving a frame, wherein the frame indicates a version of a key to be used in an encryption system;
preparing a plurality of frames, each frame having a header and data;
on a frame-by-frame basis processing each individual frame by:
determining a security level for that individual frame, the security level indicating whether to provide encryption for the individual frame and whether to provide integrity for the individual frame; and
based on said security level, including security control bits in the header of that individual frame; and
communicating the plurality of frames to a recipient device,
wherein the security control bits include one or more security mode bits and integrity level bits, wherein the one or more security mode bits are used to indicate whether encryption is on or off, wherein the integrity level bits indicate which of at least four integrity levels is utilized, the integrity levels corresponding to signing operations of a sender of increasing strength, and wherein said security control bits allow the recipient device to identify said security level for each individual frame and to reject an individual frame if said security level does not comply with a minimum security level required by the recipient device.

14. The non-transitory computer-readable storage medium according to claim 13, wherein said plurality of frames are provided for transmission to multiple recipients, determining said security level includes determining a minimum security level to satisfy all of the recipients, and said security control bits are based on said minimum security level.

15. The non-transitory computer-readable storage medium according to claim 13, wherein said security level is determined based on predetermined minimum requirements.

16. The non-transitory computer-readable storage medium according to claim 15, wherein said predetermined minimum requirements are determined based on an agreed-upon rule.

17. The non-transitory computer-readable storage medium according to claim 13, wherein said security level is determined based upon content of that individual frame.

18. The non-transitory computer-readable storage medium according to claim 13, the operations further comprising encrypting the data for each individual frame according to said security level for the frame.

19. The non-transitory computer-readable storage medium according to claim 13, wherein said security control bits include an indication of a cryptographic algorithm parameter.

20. The non-transitory computer-readable storage medium according to claim 13, the operations further comprising signing the header and data for each individual frame according to said security level for the frame.

21. The non-transitory computer-readable storage medium according to claim 13, wherein the number of integrity levels is four, and the four integrity levels correspond to key lengths of 0, 32, 64, and 128 bits.

22. The non-transitory computer-readable storage medium according to claim 13, wherein one of the integrity levels uses a key length of 128 bits.

23. The non-transitory computer-readable storage medium according to claim 13, wherein one of the integrity levels indicates no integrity security.

24. The non-transitory computer-readable storage medium according to claim 13, wherein the number of integrity levels is at least four, and the at least four levels include four levels corresponding to key lengths of 0, 32, 64, and 128 bits.

25. A method performed by a communication device, the method comprising:
said communication device receiving a frame, wherein the frame indicates a version of a key to be used in an encryption system, each frame having a header and associated data, the header of each individual frame including security control bits that indicate for that individual frame whether encryption has been provided for the individual frame and whether integrity has been provided for the individual frame,
wherein the security control bits include one or more security mode bits and integrity level bits, wherein the one or more security mode bits are used to indicate whether encryption is on or off, and wherein the integrity level bits indicate which of at least four integrity levels is utilized, the integrity levels corresponding to signing operations of a sender of increasing strength;
for each frame, said communication device:
identifying a security level for the frame based on the security control bits in the header of the frame;
checking said security level against predetermined security requirements for said communication device; and
rejecting the frame if said security level does not meet said predetermined security requirements.

26. The method according to claim 25, wherein said security level is selected by another device based on said predetermined security requirements for said communication device.

27. The method according to claim 26, wherein said predetermined security requirements are determined among said communication device and said other device based on an agreed-upon rule.

28. The method according to claim 25, wherein said security control bits include an indication of a cryptographic algorithm parameter.

29. The method according to claim 25, further comprising decrypting each frame according to said security level for the frame.

30. The method according to claim 25, further comprising verifying the integrity of each frame according to said security level for the frame.

31. The method of claim 25, wherein the number of integrity levels is four, and the four integrity levels correspond to key lengths of 0, 32, 64, and 128 bits.

32. The method of claim 25, wherein one of the integrity levels uses a key length of 128 bits.

33. The method of claim 25, wherein one of the integrity levels indicates no integrity security.

34. The method of claim 25, wherein the number of integrity levels is at least four, and the at least four levels include four levels corresponding to key lengths of 0, 32, 64, and 128 bits.

35. A non-transitory computer-readable storage medium comprising computer-executable instructions that are operable when executed, by data processing apparatus of a communication device, to perform operations comprising:
receiving a frame, wherein the frame indicates a version of a key to be used in an encryption system, each frame having a header and associated data, the header of each individual frame including security control bits that indicate for that individual frame whether encryption has been provided for the individual frame and whether integrity has been provided for the individual frame,
wherein the security control bits include one or more security mode bits and integrity level bits, wherein the one or more security mode bits are used to indicate whether encryption is on or off, and wherein the integrity level bits indicate which of at least four integrity levels is utilized, the integrity levels corresponding to signing operations of a sender of increasing strength;

for each frame:
identifying a security level for the frame based on the security control bits in the header of the frame;
checking said security level against predetermined security requirements for said communication device; and
rejecting the frame if said security level does not meet said predetermined security requirements.

36. The non-transitory computer-readable storage medium according to claim 35, wherein said security level is selected by another device based on said predetermined security requirements for said communication device.

37. The non-transitory computer-readable storage medium according to claim 35, wherein said predetermined security requirements are determined among the communication device and another device based on an agreed-upon rule.

38. The non-transitory computer-readable storage medium according to claim 35, wherein said security control bits include an indication of a cryptographic algorithm parameter.

39. The non-transitory computer-readable storage medium according to claim 35, the operations further comprising decrypting each frame according to said security level for the frame.

40. The non-transitory computer-readable storage medium according to claim 35, the operations further comprising verifying the integrity of each frame according to said security level for the frame.

41. The non-transitory computer-readable storage medium according to claim 35, wherein the number of integrity levels is four, and the four integrity levels correspond to key lengths of 0, 32, 64, and 128 bits.

42. The non-transitory computer-readable storage medium according to claim 35, wherein one of the integrity levels uses a key length of 128 bits.

43. The non-transitory computer-readable storage medium according to claim 35, wherein one of the integrity levels indicates no integrity security.

44. The non-transitory computer-readable storage medium according to claim 35, wherein the number of integrity levels is at least four, and the at least four levels include four levels corresponding to key lengths of 0, 32, 64, and 128 bits.

* * * * *